United States Patent
Kim et al.

(10) Patent No.: US 9,915,296 B2
(45) Date of Patent: Mar. 13, 2018

(54) RETURN SPRING COMMON STRUCTURE OF AUTOMATIC TRANSMISSION

(71) Applicant: Hyundai Motor Company, Seoul (KR)

(72) Inventors: Hyung Min Kim, Seongnam-si (KR); Kang Hoon Lee, Goyang-si (KR); Jae Young Jeon, Osan-si (KR); Won Seok Oh, Boryeong-si (KR)

(73) Assignee: Hyundai Motor Company, Seoul (KR)

( * ) Notice: Subject to any disclaimer, the term of this patent is extended or adjusted under 35 U.S.C. 154(b) by 221 days.

(21) Appl. No.: 14/817,042

(22) Filed: Aug. 3, 2015

(65) Prior Publication Data

US 2016/0131200 A1 May 12, 2016

(30) Foreign Application Priority Data

Nov. 11, 2014 (KR) .................. 10-2014-0156443

(51) Int. Cl.
| | |
|---|---|
| *F16D 13/52* | (2006.01) |
| *F16D 21/06* | (2006.01) |
| *F16D 25/08* | (2006.01) |
| *F16D 25/10* | (2006.01) |
| *F16D 13/69* | (2006.01) |

(52) U.S. Cl.
CPC ............ *F16D 13/52* (2013.01); *F16D 21/06* (2013.01); *F16D 25/082* (2013.01); *F16D 25/10* (2013.01); *F16D 13/69* (2013.01); *F16D 2021/0661* (2013.01)

(58) Field of Classification Search
CPC .......... F16D 25/10; F16D 21/06; F16D 13/52; F16D 25/086
See application file for complete search history.

(56) References Cited

U.S. PATENT DOCUMENTS

| | | | | |
|---|---|---|---|---|
| 2,846,040 | A * | 8/1958 | Binder | F16D 43/12 192/105 C |
| 3,211,265 | A * | 10/1965 | Crutchley | F16D 21/06 192/48.7 |
| 3,521,731 | A * | 7/1970 | Labat | F16D 21/06 192/48.91 |
| 6,382,382 | B1 * | 5/2002 | Avny | F16D 25/0638 192/106 F |
| 2012/0214639 | A1 * | 8/2012 | Davis | F16D 21/06 475/323 |

(Continued)

FOREIGN PATENT DOCUMENTS

| | | |
|---|---|---|
| JP | 2009-236205 A | 10/2009 |
| JP | 2012-177435 A | 9/2012 |

(Continued)

*Primary Examiner* — Stacey Fluhart
(74) *Attorney, Agent, or Firm* — Morgan, Lewis & Bockius LLP

(57) ABSTRACT

A return spring common structure of an automatic transmission may include a second plate set and a third plate set provided to be transversely movable in a retainer connected to a first rotating element, a second disc set and a third disc set configured to be rubbed against each plate set to connect between the first rotating element and a second rotating element, a second piston and a third piston configured to press each plate set to be rubbed against each disc set, and a common return spring configured to separate the second piston or the third piston from the second plate set or the third plate set.

7 Claims, 3 Drawing Sheets

(56) References Cited

U.S. PATENT DOCUMENTS

2014/0209424 A1* 7/2014 Kim .................. F16D 21/06
  192/48.609
2015/0226273 A1* 8/2015 Trent ................. F16D 13/74
  192/48.601

FOREIGN PATENT DOCUMENTS

| KR | 10-2001-0061212 A | 7/2001 |
| KR | 20-0285105 Y1 | 7/2002 |
| KR | 10-0387813 B1 | 6/2003 |
| KR | 10-2007-0092351 A1 | 9/2007 |
| KR | 10-0887839 B1 | 3/2009 |
| KR | 10-2009-0071711 A | 7/2009 |

* cited by examiner

RETURN SPRING COMMON STRUCTURE OF AUTOMATIC TRANSMISSION

CROSS-REFERENCE TO RELATED APPLICATION

The present application claims priority to Korean Patent Application No. 10-2014-0156443, filed Nov. 11, 2014, the entire contents of which is incorporated herein for all purposes by this reference.

BACKGROUND OF THE INVENTION

Field of the Invention

The present invention relates to a return spring common structure of an automatic transmission, and more particularly, to a return spring common structure of an automatic transmission with a reduced weight and improved assembly performance.

Description of Related Art

Generally, an automatic transmission is an apparatus which automatically performs a shift operation of shifting a torque transferred from an engine to be transferred to a driving wheel depending on a shift pattern and is configured to include a torque converter transferring a driving force of the engine to an input shaft of the transmission, a planetary gear shifting the driving force of the engine depending on a driving state of a vehicle, and a clutch and a brake controlling the driving force of the engine transferred to the planetary gear.

In particular, as the clutch included in the automatic transmission, a plurality of plates and a multi-plate clutch with which a plurality of discs are rubbed have been mainly used.

Transmission oil is injected into an oil chamber and thus a piston connected to the oil chamber presses the plurality of plates to rub the plate against the disc, power is transferred between a rotating element connected to the plate and a rotating element connected to the disc, and the transmission oil is discharged from the oil chamber to remove a force of the piston pressing the plate and cut off power between the two rotating elements.

In this case, the piston returns to a position before being pressed by the transmission oil by an elastic force of the return spring.

However, as the automatic transmission is multi-staged, the return spring and a snap ring fixing the return spring are many equipped in the automatic transmission. Therefore, the multiple return springs and snap rings fixing the return spring lead to an increase in weight of the automatic transmission and reduce assembly convenience.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a return spring common structure of an automatic transmission with a reduced weight and improved assembly performance of a transmission by allowing a plurality of pistons to share one return spring.

According to various aspects of the present invention, a return spring common structure of an automatic transmission may include a second plate set and a third plate set provided to be transversely movable in a retainer connected to a first rotating element, a second disc set and a third disc set configured to be rubbed against each plate set to connect between the first rotating element and a second rotating element, a second piston and a third piston configured to press each plate set to be rubbed against each disc set, and a common return spring configured to separate the second piston or the third piston from the second plate set or the third plate set.

The third piston may be positioned inside the second piston.

The retainer may include a third snap ring supporting the common return spring and a second snap ring supporting the second plate set pressed by the second piston.

The second piston may include a disc-shaped second hollow surface part configured to seat the third piston on an inner diameter of the disc-shaped second hollow surface part, a plurality of second pressing parts vertically protruding from the hollow surface part and penetrating through the third plate set to contact the second plate set, and a second support part supporting the common return spring between the plurality of second pressing parts.

The third piston may include a third hollow surface part having a disc shape with a diameter smaller than that of the second hollow surface part and protrudedly provided with a seating end seated on the second hollow surface part, a third pressing part having an inner diameter smaller than that of the second pressing part and formed at an edge of the third hollow surface part to press the second plate set, and a third support part positioned between the second pressing parts, protruding from the third pressing part to contact the second support part, and supporting the common return spring.

The common return spring may include a disc-shaped spring plate attached with the common return spring and having a same diameter as that of the second hollow surface part, and the spring plate may be supported to the third snap ring.

The spring plate may be provided with a slit through which the second pressing part formed to press the second plate set to the second piston penetrates.

The third plate set may be provided with a slit through which the second pressing part formed to press the second plate set to the second piston penetrates.

According to various aspects of the present invention, a return spring common structure of an automatic transmission may include a common return spring configured to transfer a return force to a first piston and a second piston, respectively.

An inside of the first piston may be provided with the second piston so that the first piston and the second piston are concentrically formed.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
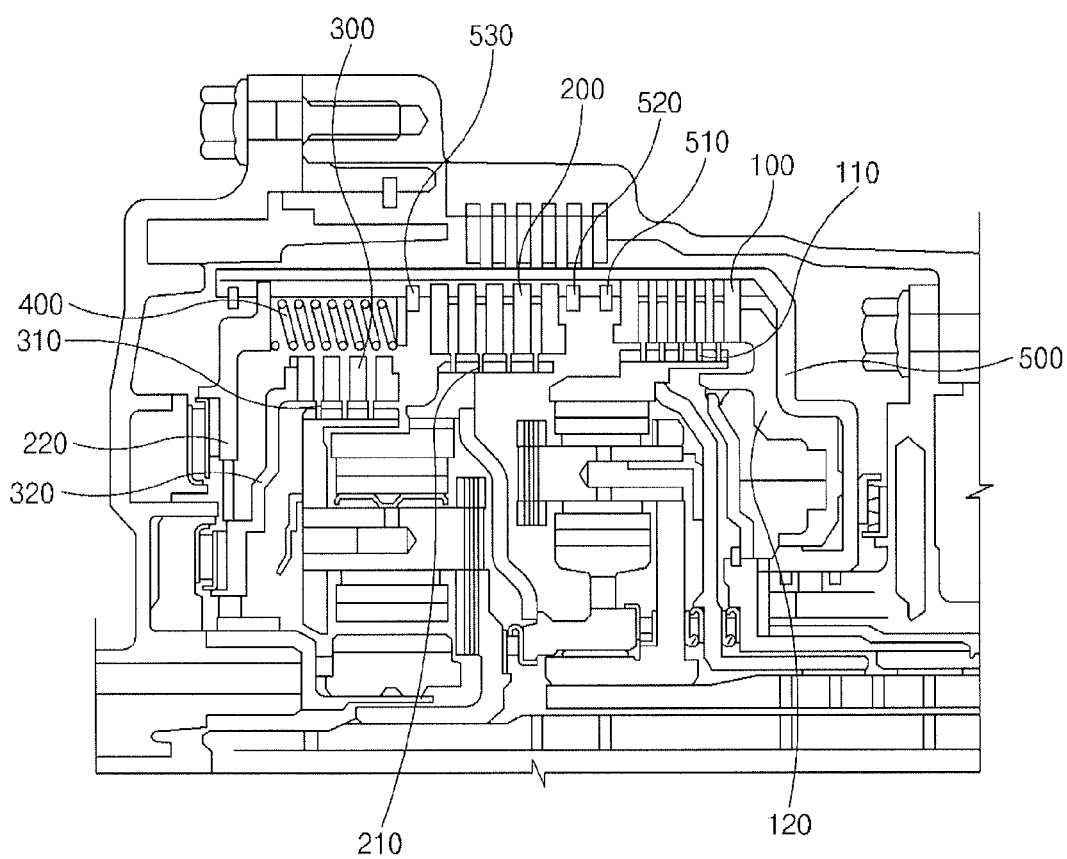
FIG. 1 is a cross-sectional view of main parts of an exemplary return spring common structure of an automatic transmission according to the present invention.
Figure 2:
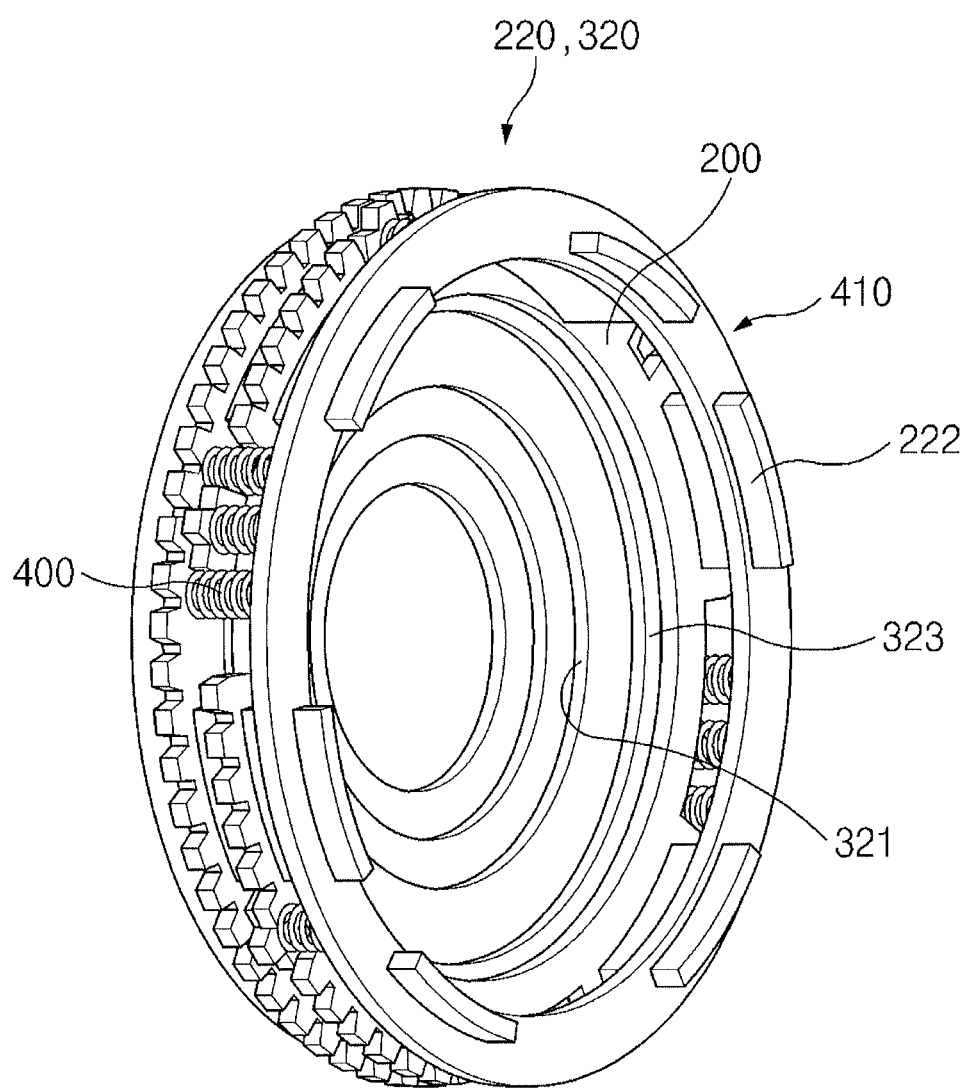
FIG. 2 is a combined perspective view of a second piston and a third piston of the exemplary return spring common structure of the automatic transmission of FIG. 1.
Figure 3:
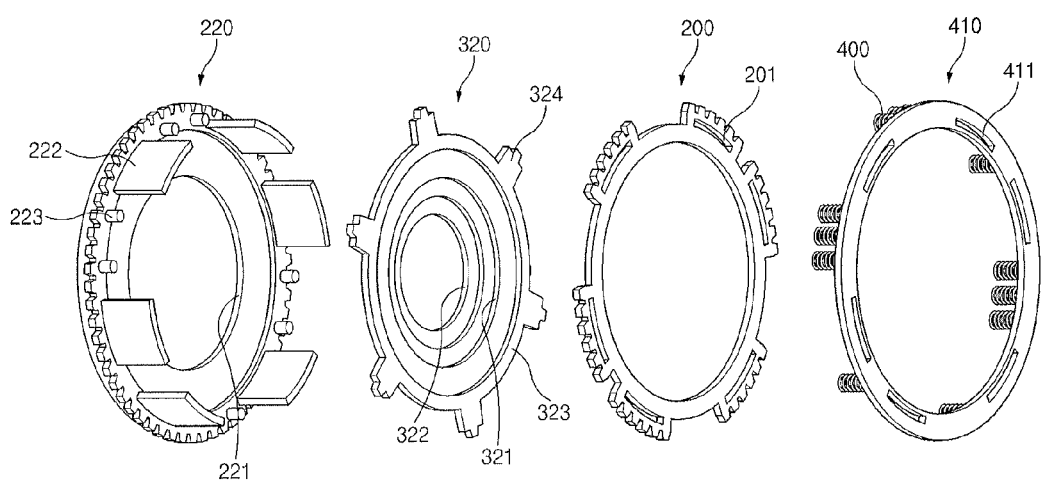
FIG. 3 is an exploded perspective view of the second piston and the third piston of the exemplary return spring common structure of the automatic transmission of FIG. 1.

As illustrated in FIG. 1 to FIG. 3, in a return spring common structure of an automatic transmission according to an exemplary embodiment of the present invention, a common return spring 400 transfers a return force to one piston and another piston, respectively. In this case, an inside of the one piston is provided with the other piston so that the one piston and the other piston have concentricity.

An exemplary embodiment of the present invention will be described in more detail. The return spring common structure of an automatic transmission according to the exemplary embodiment of the present invention includes a first plate set 100, a second plate set 200, and a third plate set 300 configured to be provided to be transversely movable in a retainer 500 connected to a rotating element, a first disc set 110, a second disc set 210, and a third disc set 310 configured to be rubbed against each plate set to connect between the rotating element and two other rotating elements, a first piston 120, a second piston 220, and a third piston 320 configured to press each plate set so that each plate set is rubbed against each disc set, and a common return spring 400 configured to separate the second piston 220 or the third piston 320 from the second plate set 200 or the third plate set 300. In this case, the inside of the second piston 220 is provided with the third piston 320.

The retainer 500 is provided with a third snap ring 530 configured to support the common return spring 400, a second snap ring 520 configured to support the second plate set 200 pressed by the second piston 220, and a first snap ring 510 configured to support the first plate set 100 pressed by the first piston 120.

The second piston 220 includes a disc-shaped second hollow surface part 221 of which the inner diameter is seated with the third piston 320, a plurality of second pressing parts 222 configured to vertically protrude from the hollow surface part and penetrate through the third plate set 300 to contact the second plate set 200, and a second support part 223 formed to support the common return spring 400 between the plurality of second pressing parts 222.

The third piston 320 has a third hollow surface part 321 configured to have a disc shape having a diameter smaller than that of the second hollow surface part 221 and be protrudedly provided with a seating end 322 seated on the second hollow surface part 221, a third pressing part 323 configured to have an inner diameter smaller than that of the second pressing part 222 and be formed at an edge of the third hollow surface part 321 to press the second plate set 200, and a third support part 324 configured to be positioned between the second pressing parts 222, protrude from the third pressing part 323 to contact the second support part 223, and support the common return spring 400.

The common return spring 400 includes a disc-shaped spring plate 410 attached with the common return spring 400 and having the same diameter as that of the second hollow surface part 221 and the spring plate 410 is supported to the third snap ring 530. Further, the spring plate 410 is provided with a slit 411 through which the second pressing part 222 formed to press the second plate set 200 to the second piston 220 penetrates. Meanwhile, the second plate set 200 is also provided with a slit 201 through which the second pressing part 222 formed to press the second plate set 200 to the second piston 220 penetrates.

The common return spring 400 is directly assembled with the second piston 220 and the third piston 320 to serve to return the second piston 220 and the third piston 320, respectively, to an original position. When the second piston 220 and the third piston 320 are not operated, the second piston 220 and the third piston 320 prevent the second plate set 200 and the third plate set 300 from adhering to the second disc set 210 and the third disc set 310, thereby reducing a drag loss.

The various embodiments of the present invention configured as described above have a structure in which the return spring is disposed in the clutch retainer 500, in which one spring may perform a role of the return spring for each of the two pistons. Therefore, one return spring and two snap rings are removed, and as a result, costs may be reduced, a total weight of the transmission may be reduced, and the assembly performance of the transmission may be increased.

As described above, according to the return spring common structure of an automatic transmission in accordance with various embodiments of the present invention, one piston and another piston share the return spring and therefore, the total number of return springs equipped in the transmission and the number of snap rings fixing the return spring are reduced, thereby reducing the weight of the transmission and improving the assembly performance of the transmission.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A return spring common structure of an automatic transmission, comprising:
   a first plate set, a second plate set and a third plate set provided to be transversely movable in a retainer connected to a first rotating element;
   a first disc set, a second disc set and a third disc set configured to be rubbed against respective plate set of the first, second, and third plate sets to connect between the first rotating element and a second rotating element;
   a first piston, a second piston and a third piston configured to press a respective plate set to be rubbed against the respective disc set; and
   a return spring assembly configured to separate the second piston from the second plate set or the third piston from the third plate set,
   wherein the second piston comprises:
      a disc-shaped first hollow surface part configured to contact the third piston on an inner diameter of the disc-shaped first hollow surface part;
      a plurality of first pressing parts vertically protruding from the first hollow surface part and penetrating through the third plate set to contact the second plate set; and
      a first support part supporting the return spring assembly between the plurality of first pressing parts.

2. The return spring common structure of the automatic transmission according to claim 1, wherein the third piston is positioned inside the second piston.

3. The return spring common structure of the automatic transmission according to claim 1, wherein the retainer comprises:
   a third snap ring supporting the return spring assembly;
   a second snap ring supporting the second plate set pressed by the second piston; and
   a first snap ring supporting the first plate set pressed by the first piston.

4. The return spring common structure of the automatic transmission according to claim 1, wherein the third piston comprises:
   a second hollow surface part having a disc shape with a diameter smaller than that of the first hollow surface part and protrudedly provided with a seating end seated on the second hollow surface part;
   a second pressing part having an inner diameter smaller than that of the first pressing part and formed at an edge of the second hollow surface part to press the second plate set; and
   a second support part positioned between the first pressing parts, protruding from the second pressing part to contact the first support part, and supporting the return spring assembly.

5. The return spring common structure of the automatic transmission according to claim 4, wherein the return spring assembly includes a disc-shaped spring plate attached with the return spring assembly and having a same diameter as that of the second hollow surface part, and
   the spring plate is supported by the third snap ring.

6. The return spring common structure of the automatic transmission according to claim 5, wherein the spring plate is provided with a slit through which the second pressing part formed to press the second plate set to the second piston penetrates.

7. The return spring common structure of the automatic transmission according to claim 1, wherein the third plate set is provided with a slit through which a second pressing part penetrates.

* * * * *